(12) United States Patent (10) Patent No.: US 8,516,218 B2
Sauer et al. (45) Date of Patent: Aug. 20, 2013

(54) PATTERN-BASED MAPPING FOR STORAGE SPACE MANAGEMENT

(75) Inventors: Jonathan M. Sauer, Cupertino, CA (US); Sesidhar Baddela, Santa Clara, CA (US); Jean-Marc P. Eurin, San Jose, CA (US); Jorge Valle, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1848 days.

(21) Appl. No.: 11/590,459

(22) Filed: Oct. 30, 2006

(65) Prior Publication Data

US 2008/0104359 A1    May 1, 2008

(51) Int. Cl.
*G06F 12/00* (2006.01)
(52) U.S. Cl.
USPC .................. 711/202; 711/203; 711/E12.058
(58) Field of Classification Search
USPC ................................. 711/202, 206, E12.014
See application file for complete search history.

(56) References Cited

U.S. PATENT DOCUMENTS

| 5,448,301 | A | * | 9/1995 | Michener | 348/578 |
| 5,915,129 | A | * | 6/1999 | Slivka et al. | 711/E12.019 |
| 6,874,061 | B1 | * | 3/2005 | Bridge | 711/114 |
| 2004/0221192 | A1 | * | 11/2004 | Motta et al. | 711/203 |
| 2007/0061509 | A1 | * | 3/2007 | Ahluwalia et al. | 711/112 |
| 2007/0061512 | A1 | * | 3/2007 | Taguchi et al. | 711/114 |

OTHER PUBLICATIONS

"The American Heritage College Dictionary," Houghton Mifflin, 4th Edition, pp. 545.*

* cited by examiner

*Primary Examiner* — Michael Krofcheck

(57) ABSTRACT

In an embodiment of the invention, an apparatus and method for storage space management performs the steps including: activating a logical volume group; reading pattern-based mapping information from physical volumes in the logical volume group; and using the pattern-based mapping information to determine a target physical extent in at least one of the physical volumes for a received request.

17 Claims, 6 Drawing Sheets

PATTERN-BASED MAPPING FOR STORAGE SPACE MANAGEMENT

TECHNICAL FIELD

Embodiments of the invention relate generally to a pattern-based mapping for storage management.

BACKGROUND

In data storage technology, a volume manager will group a collection of physical storage disks into one or more logical volumes, so that a user application will view each logical volume as a single storage device, even though the logical volume may contain multiple physical storage disks. Physical storage disks are also referred to as physical volumes. Volume managers that manage current storage hardware include, for example, the HP-UX LVM (Logical Volume Manager) which is commercially available from HEWLETT-PACKARD COMPANY, Palo Alto, Calif. and the LINUX LVM2 volume manager, as well as other volume managers from other vendors. A volume manager will manage the group of disks in the logical volumes by the use of configuration data which is data that the volume manager will store in a meta-data region in each physical storage disk belonging to the logical volumes. The meta-data region is used by the volume manager to manage the storage in the logical volumes and maintain how the user data maps to the physical storage disks.

Current volume managers are limited in the amount of user data that they can represent due to the outdated fixed physical size of existing disk resident metadata structures. Many current volume managers are designed with fixed disk layouts and fixed size data structures that were based on the storage size expectations that were acceptable in past years. As data storage needs continue to increase exponentially, these existing static data structures for meta-data are inadequate to keep up with current data storage needs. In other words, if customers will add new disks to the logical volumes, the user data will also increase in size and will have to be stored in the limited meta-data regions in the disks. Furthermore, disk sizes are also being increased in order to meet the increasing data storage needs, and typically, this trend disadvantageously leads to larger-sized devices.

Current data storage systems are not able to increase the amount of user data storage to an existing collection of disks, while using the limited disk regions already reserved for meta-data and also avoiding relocation (migration) or re-layout of existing user data. For example, in one current approach to attempt to store more user data, the storage system will migrate the user data to a new set of storage devices which has a larger space reserved up-front for meta-data structures. The disadvantages of this approach are that 1) customers need to have a second set of storage on hand; 2) the time to migrate may be quite large given today's database/file system sizes; and 3) it reserves larger disk space which is then not available for customer use. As another example, in another current approach to attempt to store more user data, the volume manager will store its meta-data on disk in a new modified data layout where the meta-data is split into different non-contiguous regions in the disks. Therefore, this approach disadvantageously requires a major restructuring to the software and to the migration of the user data to this new layout, and this layout of non-contiguous regions leads to maintenance difficulties for customers. Furthermore, if an existing disk is full, there would be no disk space to fragment the meta-data, unless the user data is moved to other disks, and this move of the user data leads to further disadvantages.

Therefore, the current technology is limited in its capabilities and suffers from at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
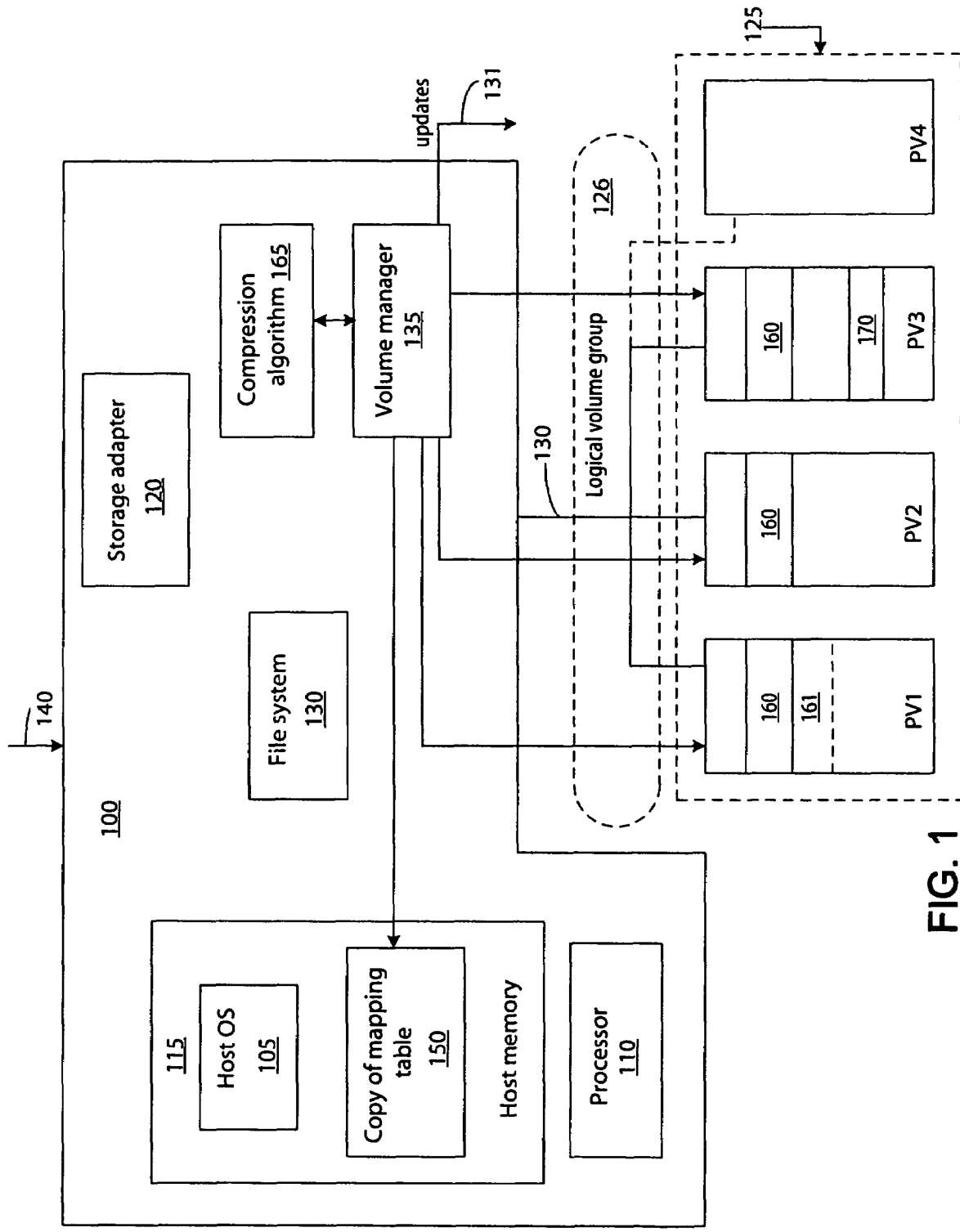
FIG. 1 is a block diagram of a system (apparatus) in accordance with an embodiment of the invention.

FIG. 1 is a block diagram of a system (apparatus) 100 in accordance with an embodiment of the invention. The system 100 is typically a computer system that is in a computing device. The system 100 includes a host operating system (host OS) 105 for permitting various computing operations. As an example, the host OS 105 may be an operating system in the HP-UX OS family, although the host OS 105 may be another suitable type of operating system. The system 100 also includes a hardware layer formed by, for example, a processor 110 that executes software in the system 100, memory devices such as a host memory 115, and a storage adapter 120 for receiving and sending messages across a network, including storage-related service requests to the system 100. Other components that are known to those skilled in the art are not shown in FIG. 1 for purposes of achieving clarity in the drawings.

A storage system 125 is connected to the system 100 via a network (e.g., SAN or Storage Area Network) 130 or via a direct connection to the system 100. The storage system 125 is formed by one or more physical volumes (i.e., physical disks). Note that the storage system 125 may virtualize the actual physical disks. In the example of FIG. 1, the storage system 125 includes the physical volumes (disks) PV1, PV2, and PV3, although the number of physical volumes in the storage system 125 may vary in other examples.

Logical volumes are mapped to the physical volumes (physical disks) PV1-PV3. Therefore, a logical volume group will span multiple physical volumes. By definition, a logical volume group 126 is formed by the physical volumes and the logical volumes.

Figure 2:
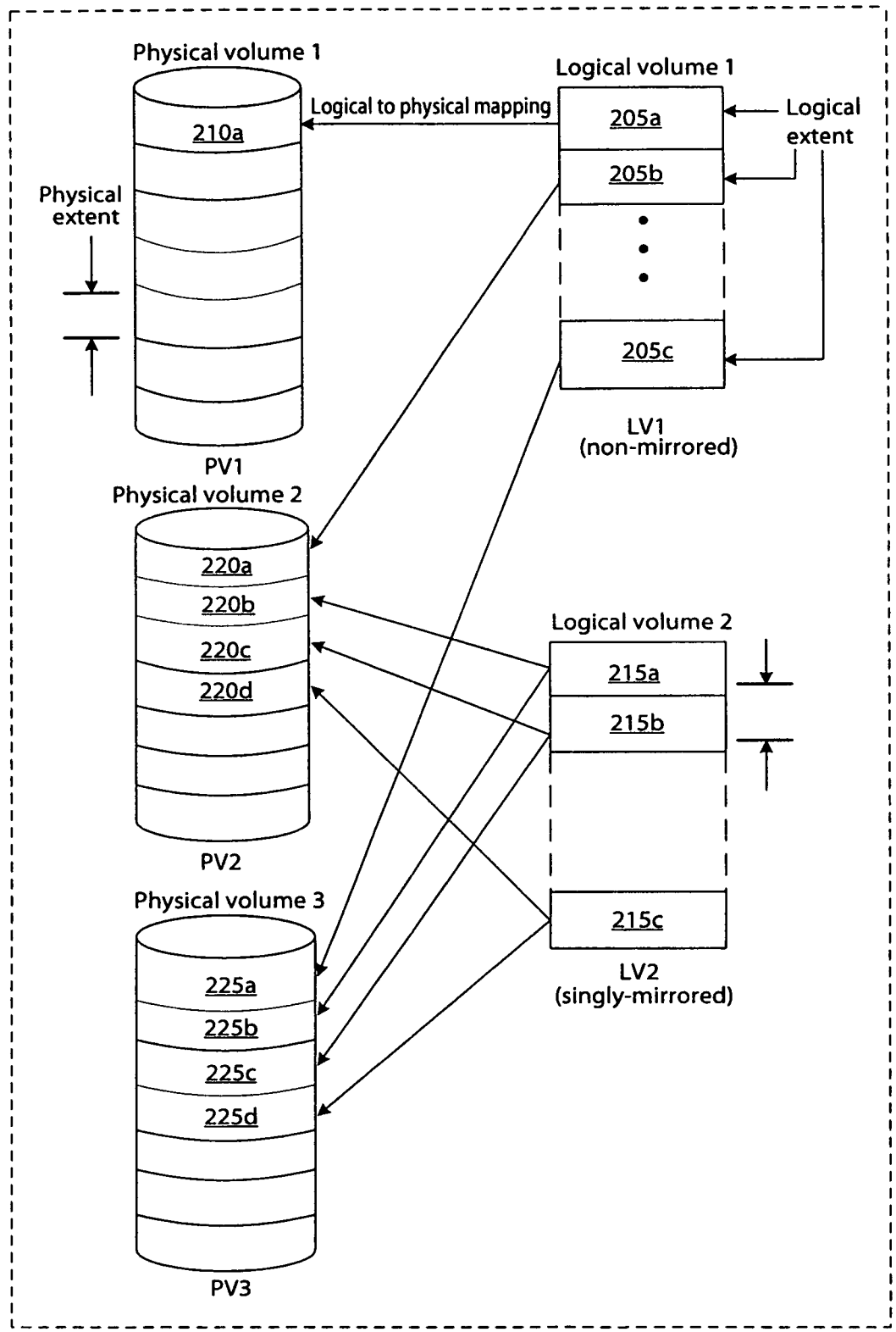
FIG. 2 is a block diagram of a logical volume to physical volume mapping configuration that can be used in an embodiment of the invention.

As shown in the example of FIG. 2, a logical extent 205a in a logical volume LV1 is mapped to a physical extent 210a in the physical volume PV1. A logical extent is the basic unit allocation unit of a logical volume. A physical extent is an addressable memory space unit in a physical volume (disk). As further shown in the example of FIG. 2, the logical volume LV2 is singly-mirrored. As a result, each logical extent (e.g., 215a, 215b, 215c) in the logical volume LV2 is mapped to multiple physical extents. For example, logical extent 215a is mapped to physical extent 220b in physical volume PV2 and to physical extent 225b in physical volume PV3. Other configurations for the logical volume to physical volume mapping may be used. Methods for implementing the logical volume to physical volume mapping are known to those skilled in the art by use of mapping tables such as, for example, bitmaps or hashed tables.

Referring back to FIG. 1, the system 100 also includes a file system 130 and a volume manager 135. The file system 130 manages the files and folders that are stored in the physical volumes PV1-PV3. These files and folders will contain data that are stored in the physical volumes PV1-PV3. The volume manager 135 allocates the physical extents in the physical volumes PV1-PV3 to the logical volumes. The volume manager 135 will process the read and write requests (i.e., I/O requests) 140 that are received by the system 100 from another node (e.g., a client computer) that is connected to the system 100 via a network (e.g., SAN). The file system 130 processes the I/O requests 140 to determine the file and/or folder that will be access for a data read operation or write operation. The volume manager 135 will translate a logical address in the I/O requests 140 into a physical address of a physical volume that will be accessed for a read operation or write operation. The file system 130 and/or volume manager 135 can be integrated with the host OS 105, or alternatively, the host OS 105 can be designed to perform the functions of the file system 130 and/or volume manager 135. The volume manager 135 can also perform known volume management operations, such as, for example, the volume management operations performed by the HP-UX LVM volume manager which is commercially available from Hewlett-Packard Company.

The volume manager 135 will read a logical address in an I/O (input/output) request 140, match the logical address with a logical extent in a logical volume, and use a mapping table to translate this logical extent into a physical address that will receive the I/O request 140. Therefore, a logical address in an I/O request 140 is first mapped at the device file layer in the system 100. The device file layer maps the I/O request 140 to the proper logical volume. As a result, the I/O request 140 is matched with a logical volume and a logical extent in the logical volume to receive the I/O request 140. As known to those skilled in the art, a mapping table, e.g., a bit map or hashed table, is used to perform the logical volume to physical volume mapping. The logical extent points to an entry (or entries) in the mapping table, and the mapping table entry (or entries) will identify the physical volume(s) and physical address (memory address) of the physical extent(s) in the physical volume(s) that will receive the I/O request 140. The volume manager 135 uses the logical address in the I/O request 140 in order to perform a table lookup operation on the mapping table.

In an embodiment of the invention, the volume manager 135 will store a copy 150 of a mapping table (e.g., bitmap or hashed table) in, for example, the host memory 115, and then compress the mapping table 160 and again store the compressed mapping table 160 into some or all of the physical volumes PV1-PV3. Each compressed mapping table 160 is stored in a meta-data region 161 of a physical volume. In an embodiment of the invention, the volume manager 135 will compress the mapping table 160 by a compression algorithm 165 which can be, for example, a suitable standard lossless data compression algorithm which is a class of algorithms that allows the exact original data to be reconstructed from the compressed data. One example of a standard lossless algorithm is Run-Length Encoding (RLE). In an embodiment of the invention, when the volume group 126 in the system 100 is activated (e.g., during system boot or system re-start, or after updates 131 are performed on the data structures in the meta-data regions in the physical disks PV1-PV3 and system re-boot is performed, or from a system administrator request), the volume manager 135 will first read the compressed mapping tables 160 from the physical volumes PV1-PV3 and un-compressed the mapping tables 160. The volume manager 135 will store a copy 150 of the un-compressed mapping tables into the host memory 115. The volume manager 135 will also again compress the un-compressed mapping tables and again store the compressed mapping tables in some or all of the physical volumes PV1-PV3.

Subsequently, when an I/O request 140 is received by the system 100 from e.g., a client computer or other device, the volume manager 135 will access the mapping table copy 150. The logical address in the I/O request 140 will point to one or more entries in the mapping table copy 150, and the one or more entries will indicate the physical volume(s) and address of the physical extent(s) in the physical volumes to receive the I/O request 140. For example, based on the logical address in the request 140, the request 140 is sent to the physical extent 170 in the physical volume PV3.

By compressing the mapping table 160 when stored in the meta-data regions 161 of physical volumes, larger data structures can be advantageously stored in the meta-data regions. Embodiments of the invention advantageously permit more data to be stored in the meta-data regions without requiring a change in any pre-existing algorithms in the volume manager or other pre-existing algorithms that reside in the meta-data regions. Therefore, the pre-existing algorithms such as, for example, data recovery algorithms and data integrity algorithms, are advantageously not affected and fundamental architectural changes in the functionality of the volume manager is advantageously avoided, while storing larger data structures in the meta-data regions. Therefore, embodiments of the invention advantageously permit in-place migration while avoiding the requirements of previous approaches such as the requirement to migrate the meta-data region data structures to other disks, or changing the disk layout to have non-continuous meta-data regions when the meta-data region data structures increases in size, or migration of the user data to other disks. For example, when the data storage system 125 is expanded by adding additional physical volumes (e.g., physical volume PV4 or/and other additional disks), the volume manager 135 will update 131 the mapping table 150 by methods that are known to those skilled in the art. The update 131 of the mapping table 150 will increase the size of the data structure of the mapping table 150 because of the added physical volume and because of the modification in the mapping of the logical volumes to the physical volumes including the added physical volume PV4. In previous approaches, forced data migration or meta-data layout changes are used in order to be able to store the increased data structure of the mapping table, if the updated data structure exceeds the meta-data region size. In contrast, an embodiment of the invention compresses the mapping table 160 when stored in the meta-data regions of the physical volumes, and advantageously avoids the forced data migration and meta-data layout changes of previous approaches.

Furthermore, the compressed mapping table 160 can be advantageously used in systems that do not implement the compression algorithm 165. In this case, the compressed mapping table 160 will be decompressed and then stored in the physical volumes, provided that the uncompressed meta-data structures will fit into the physical volumes in the uncompressed form.

FIG. 2 is a block diagram of a logical volume to physical volume mapping configuration that can be used in an embodiment of the invention, as previously mentioned above. Note that other logical extents in a logical volume can be mapped to other disks. For example, the logical extent 205*b* and 205*c* in logical volume LV1 are mapped to physical extents 220*a* and 225*b*, respectively. Additionally, the logical extent 215*b* is mapped to physical extents 220*c* and 225*c*, and the logical extent 215*c* is mapped to the physical extents 220*d* and 225*d*. As a result, the data in the physical extents 220*c* and 220*d* is mirrored to the physical extents 225*c* and 225*d*, respectively. As known to those skilled in the art, mirroring of data is useful in data recovery methods or failover methods.

Figure 3:
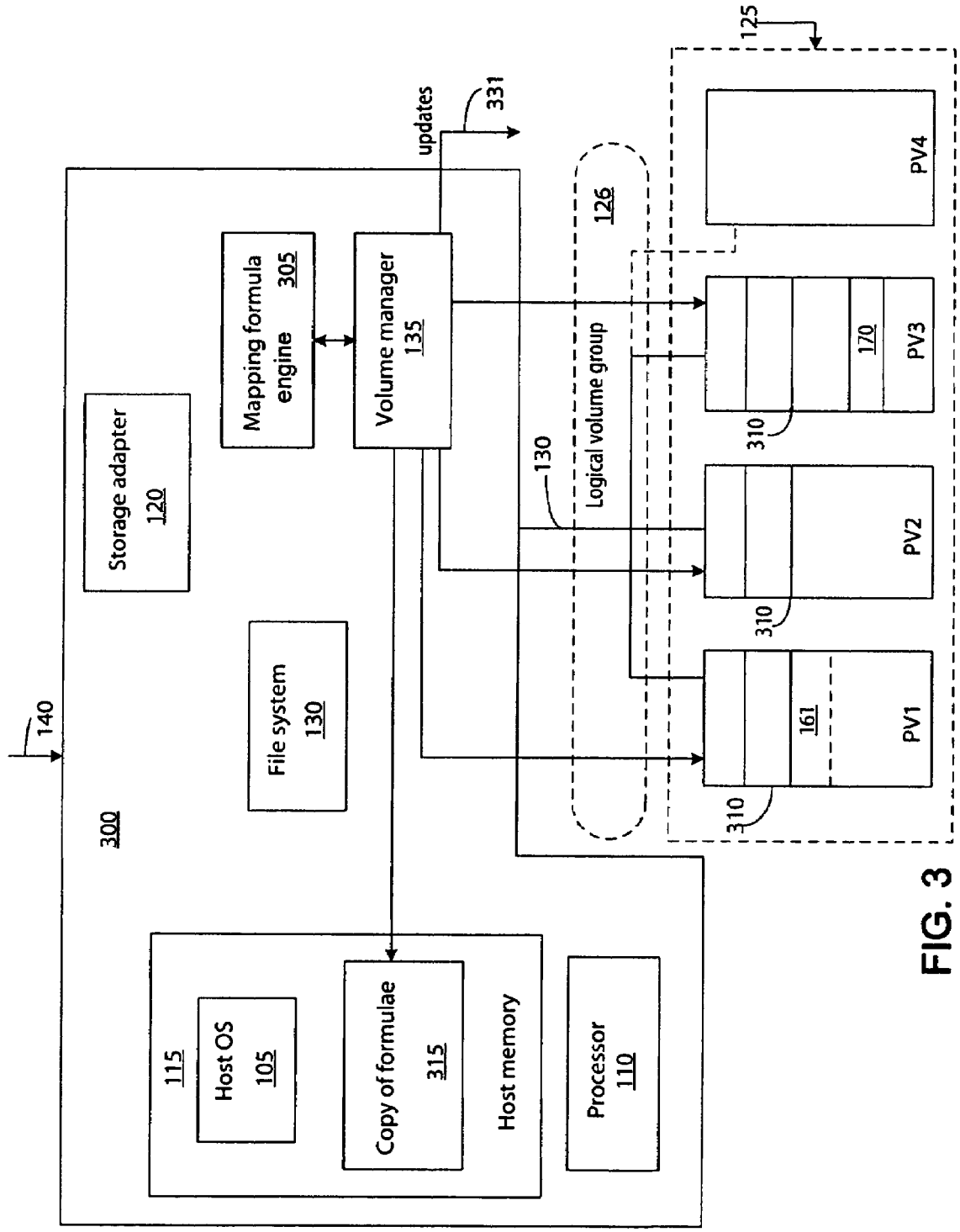
FIG. 3 is a block diagram of a system (apparatus) in accordance with another embodiment of the invention.

FIG. 3 is a block diagram of a system (apparatus) 300 in accordance with another embodiment of the invention. A mapping formula engine 305 generates mapping formulas that map a logical extent in a logical volume to a physical extent in a physical volume. Examples of these mapping formulas for use in mapping are discussed below with reference to FIG. 4A and FIG. 4B. Therefore, when an I/O request 140 is received by the system 300, the volume manager 135 can use the mapping formulas to direct the I/O request 140 to the target physical volume(s) and target physical extent(s) in the target volumes.

In embodiment of the invention, when the volume group 126 in the system 300 is activated (e.g., during system boot or system re-start or after updates 331 are performed on the data structures in the meta-data regions in the physical disks PV1-PV3, and system re-boot is performed, or from a system administrator request), the volume manager 135 will first read the mapping formulas 310 from the physical volumes PV1-PV3. The volume manager 135 typically stores the mapping formulas into the host memory 115 as a copy 315 of the mapping formulas 310. The volume manager 135 will also then again store the mapping formulas into the physical volumes PV1-PV3.

Subsequently, when an I/O request 140 is received by the system 300 from e.g., a client computer or other device, the volume manager 135 will access the copy 315 of the mapping formulas in the host memory 115 if the copy 315 has been previously stored in the host memory 115. Alternatively, the volume manager 135 can access the mapping formulas 310 in the physical volumes PV1-PV3 to determine the logical volume to physical volume mapping. The volume manager 135 will input the logical address in the I/O request 140 into the mapping formulas 310, and the mapping formulas 310 will then generate the identity of the physical volume(s) and address of the physical extent(s) in the physical volume(s) to receive the I/O request 140, as discussed below in additional details with reference to FIG. 4A and FIG. 4B. For example, based on the logical address in the request 140, the mapping formulas 310 will identify the physical extent 170 in the physical volume PV3 as the target physical extent for the I/O request 140. The volume manager 135 will then direct the request 140 to the identified target physical extent. By storing the mapping formulas 310 into the meta-data regions 161 of the physical disks, larger data structures can be advantageously stored in the meta-data regions.

When the data storage system 125 is expanded by adding additional physical volumes (e.g., physical volume PV4 or/and other additional disks), the volume manager 135 will update 331 the mapping formulas 310 based upon the modification of the logical volume to physical volume mapping. An embodiment of the invention will then store the updated mapping formulas 310 into the meta-data regions 161 of the physical volumes after updates are performed on the mapping formulas 310, and also advantageously avoids the forced data migration and meta-data layout changes of previous approaches. As an additional advantage, the mapping formula mapping engine 305 can generate mapping formulas 310 that represent the logical volume to physical volume mapping of logical volume groups that span older-type physical disks, without requiring the system administrator to manually examine the actual logical-to-physical volume mapping.

Figure 4A:
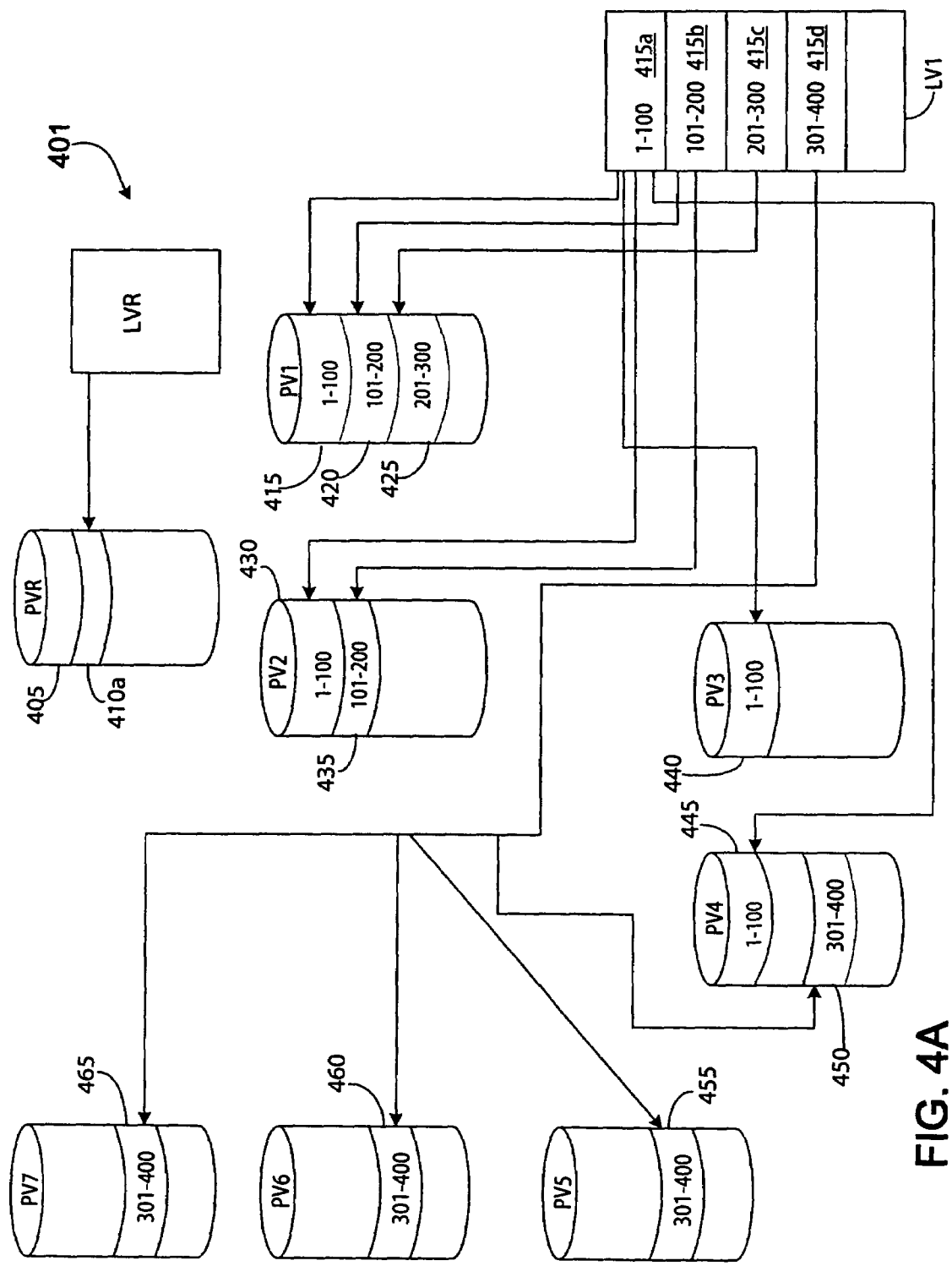
FIG. 4A is a block diagram that illustrates further details of a formula-based mapping method, in accordance with an embodiment of the invention.

FIG. 4A is a block diagram that illustrates further details of a formula-based mapping method 401 for determining the mapping formulas 310, in accordance with an embodiment of the invention. In an embodiment of the invention, the mapping formulas 310 are generated and saved in memory based upon Run-length encoding (RLE). RLE is a known form of data compression in which "runs" of data value (that is, sequences in which the same data value (characters or other data) occurs in many consecutive data elements) are stored as that single data value and count of the run, rather than as the original run. For example, RLE would substitute a run of seventeen asterisks with 17*. RLE is most useful on data that contains many such runs. In other words, the longer the run of a data value, the greater the compression of data.

A logical volume is allocated on the physical disks in a deterministic manner because a typical mapping of a logical extent is expected to exhibit a round-robin pattern on one or more physical volumes when to the round-robin and fill-first allocation technique is used by a volume manager. In the round-robin fill-first allocation technique, a logical extent is mapped to physical extent on one physical volume and perhaps in one or more additional volumes if data mirroring is used. Since the mapping formulas 310 are stored in the meta-data regions 161, memory space in a meta-data region is conserved and is available for increases in the data structure in the regions or for other data-structure features to be stored in the meta-data region. Also, the formula-based mapping will effectively compress the data-structure in the meta-data region without changing any of the above-described fundamental algorithms of the volume manager 135.

In accordance with an embodiment of the invention, the formulas 310 are created by encoding each continued run-length of extents that are mapped round-robin on a set of physical volumes. Therefore, the extent map of each logical extent is advantageously not stored in the meta-data region of a disk. Note that this extent map will map a logical extent to one or more physical extents as previously shown in FIG. 2. For each run-length, the mapping formula engine 305 will store, (1) the number of logical extents that are mapped (i.e., the run-length), (2) the number and identities of physical volumes that maps to the logical extents, and (3) the starting offset on each physical volume. A starting offset is a starting address of a physical extent that maps to a logical extent. The below examples discusses the method for generating the mapping formulas 310.

As a first example as shown in FIG. 4A, assume that logical volume LVR is a root logical volume (i.e., volume with data of the topmost node of a hierarchical file system). The mapping formula engine 305 will create a formula for mapping the root logical volume LVR to a physical disk is shown in equation (1). The offset addresses that are referenced in the equations below are not absolute and are only used for illustrating the examples of FIGS. 4A and 4B, and may be in different locations on the disks for other examples.

formula mapping for $LVR=(PVR)+$(starting offset 405)+(size of physical extent 410a) (1)

Since the data for a root logical volume is contiguous and is in only a single physical volume, the formula identifies the physical volume (e.g., PVR) for storing the root logical volume data, the starting offset 405 of the physical extent 410a for storing the root logical volume data, and the size of the physical extent 410a that stores the root logical volume data. Therefore, when an I/O request 140 with a logical address to the logical volume LVR is received, the volume manager 135 will determine based on the formula in equation (1) that the target of the I/O request 140 will be the physical extent 410a in physical volume PVR. The formula in equation (1) is stored in the meta-data regions 161 and has a size of, for example, approximately 1 MB in the meta-data regions 161. In contrast, the previous approach of using a mapping table for a root logical volume would occupy, for example, approximately 100 MB in the meta-data regions 161. The formula effectively allows a compression of approximately 100:1 for the user data structure in a disk meta-data region.

As another example, assume that logical volume LV1 has four run-lengths. These four run-lengths are, extents 1-100 on physical volumes PV1, PV2, PV3, and PV4; extents 101-200 on physical volumes PV1 and PV2; extents 201-300 on physical volume PV1; and extents 301-400 on physical volumes PV4, PV5, PV6, and PV7. In this case, there are four runs of extents that are mapped to a set of physical volumes. There are four run-length encoded records (415a-415d) for this logical volume LV1. Each run-length encoded record has an associated run-length (mapped extents) and is used in a formula 310 as shown below in equation (2).

$$\text{formula mapping for logical extents in logical volume } LV1 = \quad (2)$$

$$(\text{number of extents})[(\text{physical volumes})$$

$$(\text{starting offset of physical extent})] =$$

$$(\text{extents } 1 - 100)[(PV1, \text{offset } 415) + (PV2, \text{offset } 430) +$$

$$(PV3, \text{offset } 440) + (PV4, \text{offset } 445)] +$$

$$(\text{extents } 101 - 200)[(PV1, \text{offset } 420) + (PV2, \text{offset } 435)] +$$

$$(\text{extents } 201 - 300)[(PV1, \text{offset } 425)] +$$

$$(\text{extents } 301 - 400)[(PV4, \text{offset } 450) + (PV5, \text{offset } 455) +$$

$$(PV6, \text{offset } 460) + (PV7, \text{offset } 465)]$$

Therefore, when an I/O request 140 with a logical address has been matched to a logical extent in the logical volume LV1 is received, the volume manager 135 will determine, based on the formula in equation (2), the target physical extent of the I/O request 140. The formula in equation (2) is stored in the meta-data regions 161. The formula effectively allows a compression of approximately 26:1 for the user data structure in a disk meta-data region. Therefore, applying the encoding technique as shown in the example of equations (1) and (2) can substantially reduce the data structure in the metadata region. On an average, a compression of over 90% of the data structure in the metadata region can be achieved. In practice, a typical logical volume configuration that is represented by equation (2) is larger in size in memory and will include longer run-lengths.

Figure 4B:
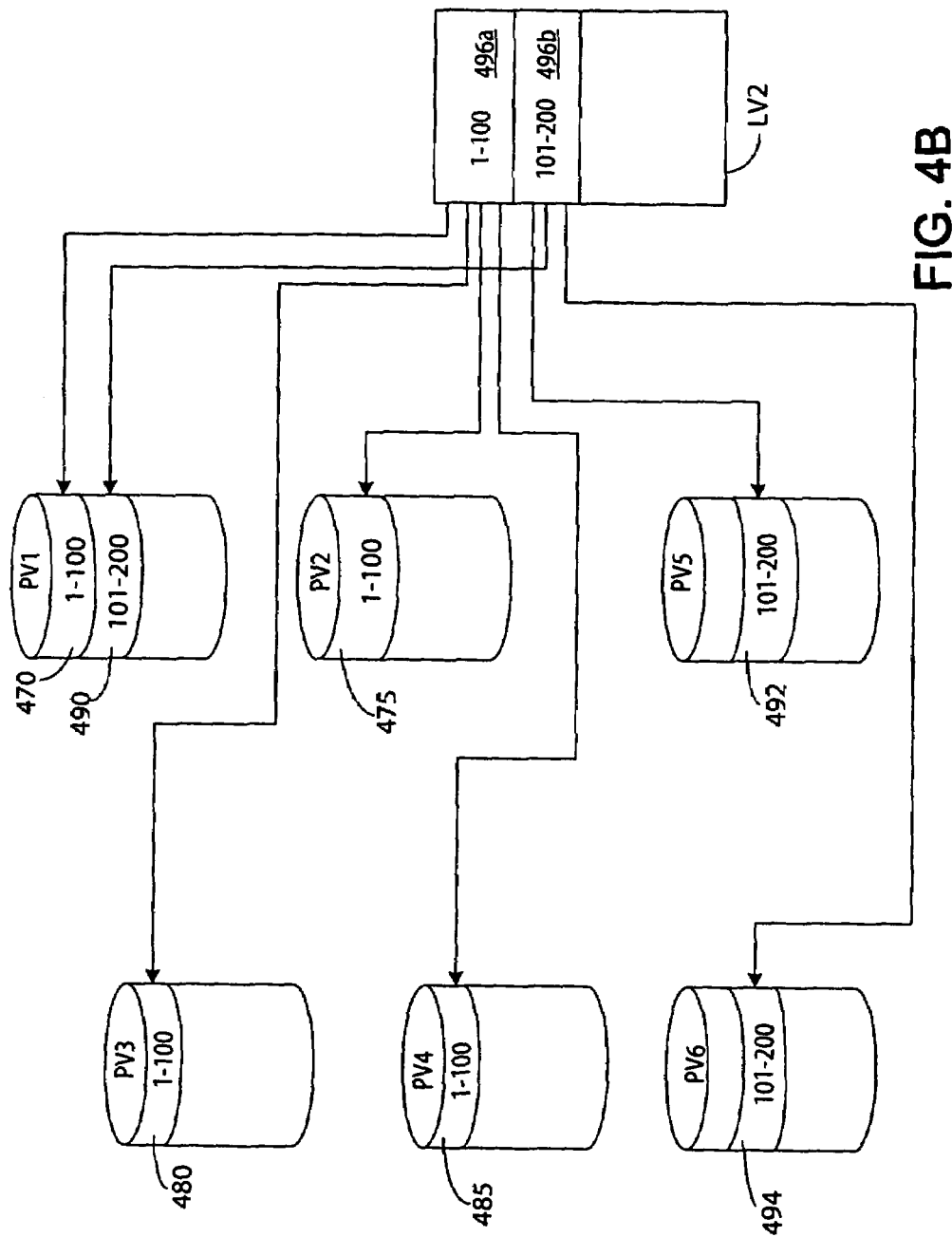
FIG. 4B is a block diagram that illustrates further details of a formula-based mapping method, in accordance with an embodiment of the invention.

As another example as shown in FIG. 4B, assume that logical volume LV2 is mirrored and has two run-lengths. These two run-lengths are, extents 1-100 on physical volumes PV1 and PV2, mirrored on PV3 and PV4; and extents 101-200 on physical volumes PV1, mirrored on PV5 and PV6. In this case, there are two runs of extents that are mapped to a set of physical volumes. There are two run-length encoded records (496a and 496b) for this mirrored logical volume LV2. Each run-length encoded record has an associated run-length (mapped extents) and is used in a formula as shown below in equation (3).

$$\text{formula mapping for logical extents in} \quad (3)$$

$$\text{mirrored logical volume } LV2 = (\text{number of extents})[$$

$$(\text{physical volumes})(\text{starting offset of physical extent})] =$$

$$(\text{extents } 1 - 100)[(PV1, \text{offset } 470) + (PV2, \text{offset } 475)] +$$

$$(\text{extents } 1 - 100)[(PV3, \text{offset } 480) + (PV4, \text{offset } 485)] +$$

$$(\text{extents } 101 - 200)[(PV1, \text{offset } 490)] +$$

$$(\text{extents } 101 - 200)[(PV5, \text{offset } 492) + (PV6, \text{offset } 494)]$$

Note that the above formulas based on run length encoding are just some possible examples that can be used in an embodiment of the invention. Suitable modifications can be made in the above example formulas or other formula expressions can be used in reducing the size of the information stored in the meta-data region.

As an added benefit, the above mapping formulas based on run-length encoding can be applied to in-memory configuration data in the host memory 115. As a result, the current host memory space 315 that is used for storing the copied metadata information of a volume group is reduced. Therefore, more memory space can be available for general purpose use.

As an additional benefit, the above mapping formula reduces the size of the data in the Volume Group Status Area (VGSA). This data contains information about logical volumes that are mirrored in the physical volumes. By reducing the VGSA, updates to the VGSA will be performed faster, and this faster update is beneficial because updates to the VGSA could be potentially blocking the user I/O requests. The above mapping formula could also reduce the data in the Volume Group Descriptor Area (VGSA), and this reduced data size could result in faster configuration updates.

An additional benefit provided by the above mapping formula is to vary the size of the VGSA. For every physical extent that is part of a mirrored logical volume, there is a bit to maintain the status of the physical extent (whether the mirrored data is fresh or stale). With large logical volumes and logical volumes with small extent size, the physical extent status bitmap will be substantially large, possibly resulting in the VGSA size exceeding the size of the metadata region. Therefore, optimizing and reducing the VGSA size is required. Also, typically only small fraction of this VGSA is used. By using the above mapping formula approach, the VGSA is treated like a level of caching used for minimizing the amount of re-synchronization of mirrors during recovery. In this approach, run length encoding of VGSA is performed by use of the mapping formula, and a bit is used for maintaining the status of a group of physical extents, rather than just one physical extent. The size of the physical extent group can vary based on the available free space in the meta-data region. A logical volume can have data in a dedicated space in VGSA or use the general pool area in the meta-data region. When most of the physical extents of a mirror copy are stale, then the whole mirror copy is treated as having stale data, since a full data resynchronization is effectively required for the mirror copy in order to make the data in the mirror copy as fresh again. By treating the whole mirror copy as having stale data in the above case, space can be saved in the meta-data region because the status (fresh or stale data status) of each physical extent is not tracked. This method of using one bit per physical extent in the logical volume can be achieved by having a dedicated space for the logical volume that is equal to or greater than the size required to hold a bitmap for all physical extents mapping to the logical volume.

Figure 5:
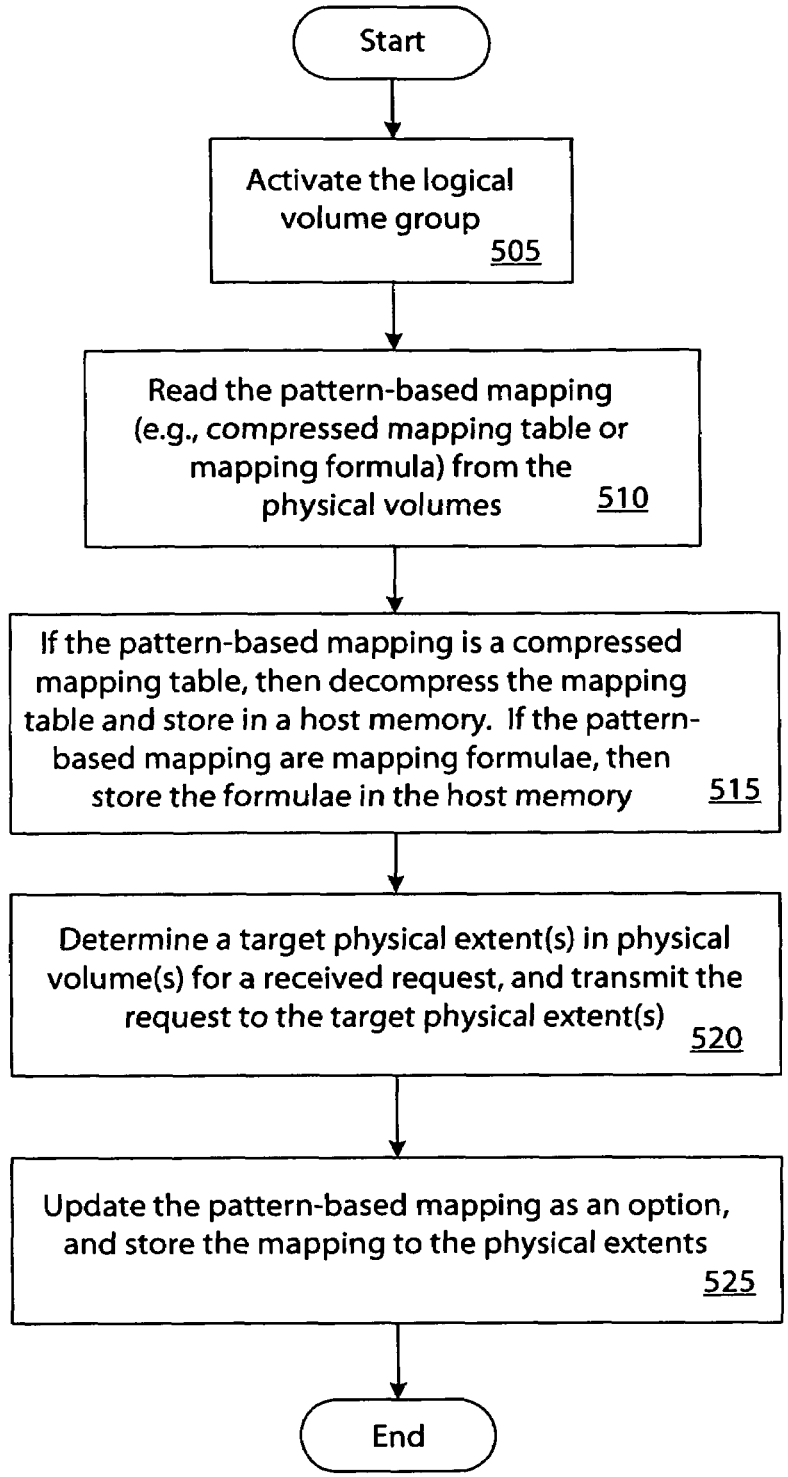
FIG. 5 is a flow diagram of a method in accordance with an embodiment of the invention.

FIG. 5 is a flow diagram of a method 500 in accordance with an embodiment of the invention. In block 505, a logical volume group is activated. In block 510, a logical volume manager will read the pattern-based mapping information from physical volumes. The pattern-based mapping information can be a compressed mapping table or a mapping formula, and the pattern-based mapping information is stored in the meta-data regions of the physical volumes.

In block 515, if the pattern-based mapping information is a compressed mapping table, then the logical volume manager will un-compress the table and store the un-compressed mapping table in a host memory. If the pattern-based mapping information are mapping formulas, then the formulas are stored in the host memory. In block 515, the volume manager again stores the pattern-based mapping information into the physical extents. The mapping information is stored in the meta-data region of the physical volumes.

In block 520, the volume manager uses the pattern-based mapping information to determine one or more target physical extent(s) in the physical volume(s) for a received request, and transmits the request to the target physical extents(s).

In block 525, the volume manager can update the pattern-based mapping information as an option, if one or more physical volumes are added to the storage system. The volume manager then stores the updated mapping information into the physical extents and this new configuration can be used from then on.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for storage space management, the method comprising:
    activating a logical volume group;
    reading a mapping formula from physical volumes in the logical volume group; and
    using a mapping formula to determine a target physical extent in at least one of the physical volumes for a received request;
    wherein the mapping formula is based on a number of extents in a logical volume, a physical volume, and a starting offset of a physical extent in the physical volume.

2. The method of claim 1, wherein the mapping formula maps a logical volume to a physical volume.

3. The method of claim 2, wherein the mapping formula maps logical extents in the logical volume to physical extents in the physical volume.

4. The method of claim 1, further comprising: storing the mapping formula in a host memory.

5. The method of claim 4, further comprising: using the mapping formula to determine the target physical extent for the request.

6. The method of claim 1, further comprising: storing the mapping formula into the physical extents.

7. The method of claim 1, wherein the mapping formula indicates at least one of: a number of extents in a logical volume, at least one physical volume, and a starting offset of a physical extent in the physical volume.

8. The method of claim 1, wherein the mapping formula permits an increase in a data structure size to be stored in meta-data regions in the physical volumes.

9. An apparatus for storage space management, the apparatus comprising: a volume manager configured to activate a logical volume group, read a mapping formula that translates from physical volumes in the logical volume group, and use the mapping formula to determine a target physical extent in at least one of the physical volumes for a received request;
    wherein the mapping formula is based on a number of extents in a logical volume, a physical volume, and a starting offset of a physical extent in the physical volume.

10. The apparatus of claim 9, wherein the mapping formula maps a logical volume to a physical volume.

11. The apparatus of claim 10, wherein the mapping formula maps logical extents in the logical volume to physical extents in the physical volume.

12. The apparatus of claim 9, wherein the volume manager is configured to store the mapping formula in a host memory.

13. The apparatus of claim 12, wherein the volume manager is configured to use the mapping formula to determine the target physical extent for the request.

14. The apparatus of claim 9, wherein the volume manager is configured to store the mapping formula into the physical extents.

15. The apparatus of claim 9, wherein a mapping formula indicates at least one selected from the group consisting of: a number of extents in a logical volume, at least one physical volume, and a starting offset of a physical extent in the physical volume.

16. The apparatus of claim 9, wherein the mapping formula permits an increase in a data structure size to be stored in meta-data regions in the physical volumes.

17. An article of manufacture, comprising:
a non-transitory machine-readable medium having stored thereon instructions to:
 activate a logical volume group;
 read a mapping formula from physical volumes in the logical volume group; and
 use the mapping formula to determine a target physical extent in at least one of the physical volumes for a received request;
 wherein the mapping formula is based on a number of extents in a logical volume, a physical volume, and a starting offset of a physical extent in the physical volume.

* * * * *